United States Patent Office 3,453,910
Patented July 8, 1969

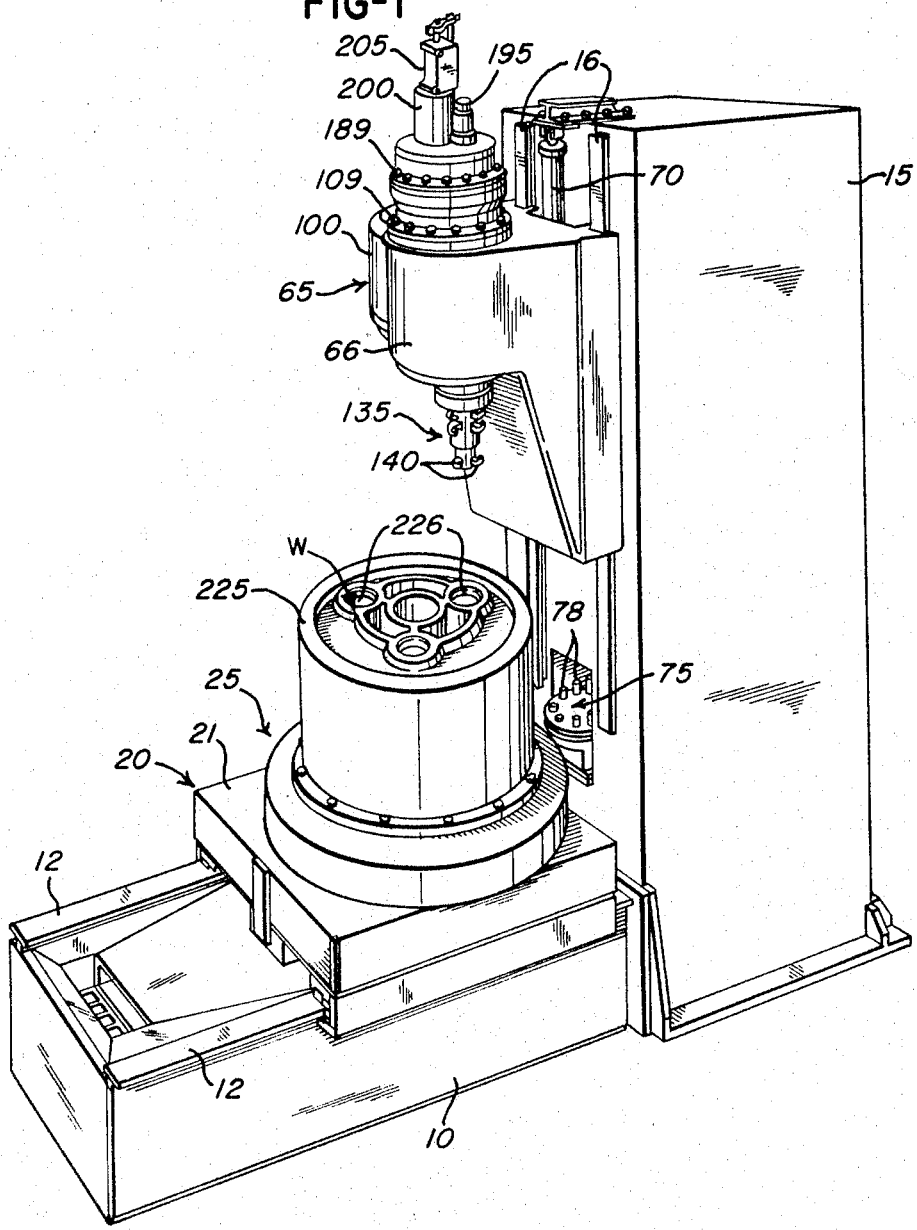

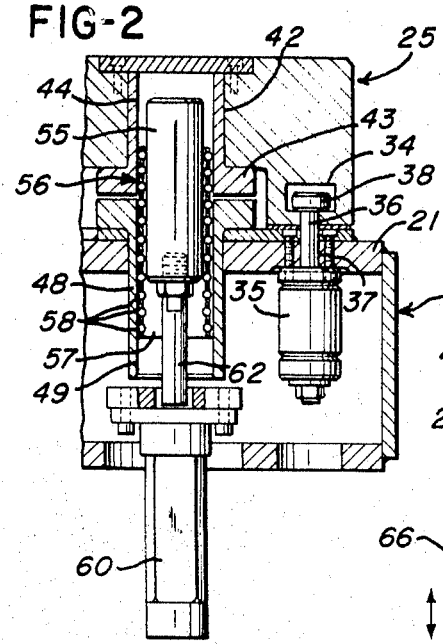
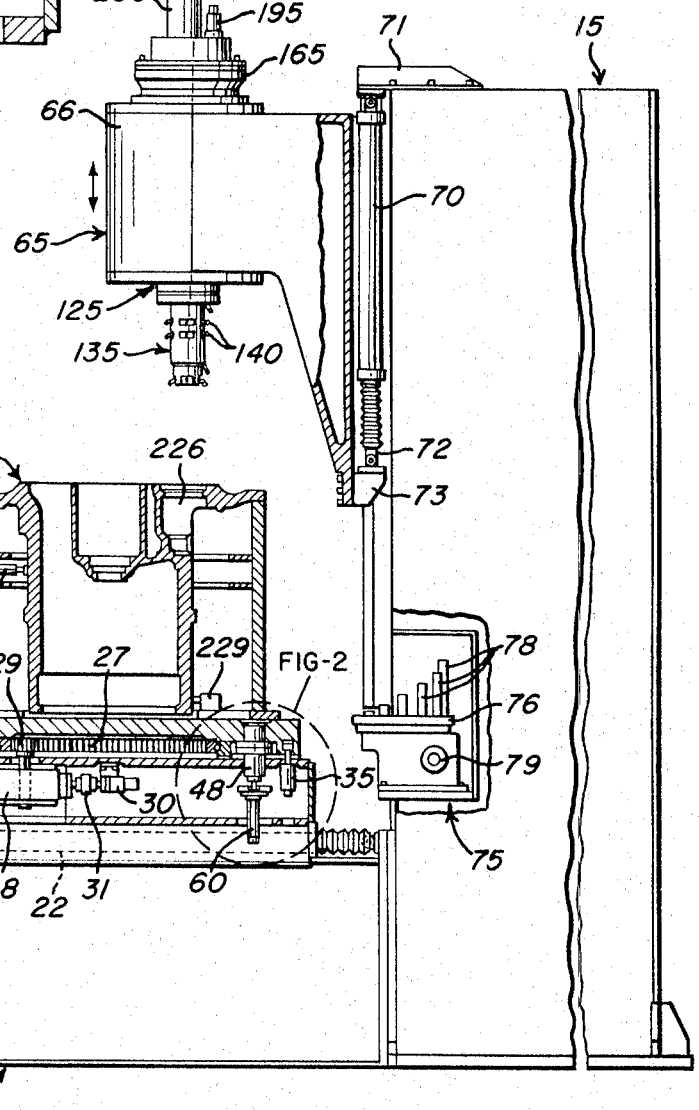

3,453,910
MACHINE TOOL
Charles F. Hautau, Oxford, Ohio, assignor to The Black Clawson Company, Hamilton, Ohio, a corporation of Ohio
Filed Aug. 16, 1967, Ser. No. 661,053
Int. Cl. B23b 41/12, 47/26
U.S. Cl. 77—4                    11 Claims

ABSTRACT OF THE DISCLOSURE

A power driven spindle is rotatably mounted within a housing and supports an axially extending boring bar positioned eccentrically to the spindle axis. The boring bar supports a head having a plurality of cutting tools in angularly disposed relation and is indexed within the spindle for selectively positioning the cutting tools to machine predetermined surfaces on a workpiece. The workpiece is supported by an index table which is clamped to a carriage by a series of hydraulic cylinders and is positively locked at each index station by a movable shot pin confined within an anti-friction sleeve bearing.

Background of the invention

To perform a series of internal machining operations within an opening of a workpiece, such as rough, semi-finish and finish boring, counterboring, internal facing, grooving or chamfering, usually a turret lathe is employed, and a series of angularly disposed boring bars are successively presented into the opening with each bar supporting a cutting tool for machining a predetermined surface on the workpiece. It is desirable to minimize chatter and/or deflection of each tool element during each machining operation, this requires that the turret head and the boring bars have substantial rigidity.

On large turret lathes, the assembly of the turret head and boring bars is quite large and massive, and significant time is required to retract each bar from the opening of the workpiece and to index the head and bring the next successive bar back into the opening for performing the next machining operation. Since there is no machining of the workpiece being performed during this time of interchanging tools, the overall time required for completely machining a workpiece requiring a number of machining operations is substantially greater than the time which would be required if the machining operations were performed in a continuous sequence.

Summary of the invention

The present invention is directed to an improved machine tool for efficiently machining a number of predetermined surfaces on a workpiece, and especially provides for performing a series of machining operations in quick succession or almost in a continuous sequence so that the overall time required for completely machining the workpiece is substantially reduced. Generally, a machine tool constructed in accordance with the invention incorporates an elongated boring bar having a cylindrical head supporting a plurality of angularly arranged or circumferentially spaced cutting tools. The bar is indexed on its axis for selectively presenting each of the cutting tools to a position for machining a predetermined internal surface on the workpiece. The indexable boring bar may be used for machining predetermined internal surfaces on a rotating workpiece, or the bar may be mounted within an axially extending bore formed eccentrically within a spindle which is driven for machining a stationary workpiece.

As mentioned above, a primary feature provided by a machine tool constructed in accordance with the invention is that a number of different internal surfaces can be successively machined on a workpiece without retracting the tool head from the opening to position the next successive cutting tool for engaging the workpiece. As a result, the time for performing a number of successive machining operations on a workpiece is substantially reduced, which is especially desirable when machining a large volume of workpieces.

The machine tool of the invention also provides substantial rigidity for all of the various cutting tools and thereby substantially eliminates vibration, chatter or deflection of each cutting tool while it is being used. While the invention is illustrated in the form of a driven boring bar for a vertical boring machine, it is to be understood that it is within the scope of the invention to support the bar for indexing within a housing mounted on a carriage for use in machining a rotating workpiece, or to position the bar horizontally or at any angle between horizontal and vertical.

Other features and advantages of the invention will be apparent from the following description, the accompanying drawings and the appended claims.

Brief description of the drawings

FIG. 1 is a perspective view of a machine tool constructed in accordance with the invention;

FIG. 2 is an enlarged fragmentary section of a locking and clamping mechanism for the worktable as shown within the dotted circle of FIG. 3;

FIG. 3 is an elevational view of the machine tool shown in FIG. 1 with portions broken away.

Description of the preferred embodiment

Figure 4:
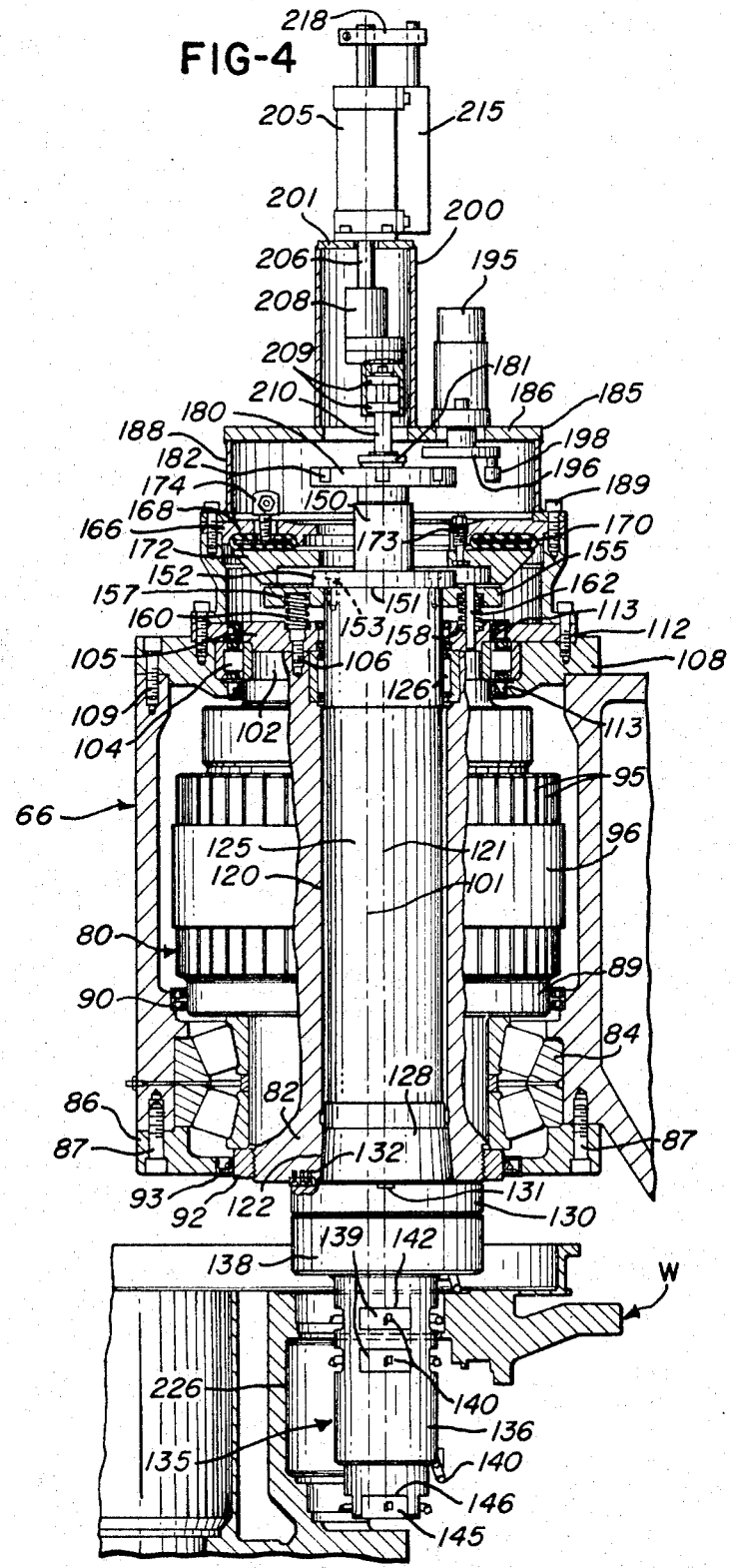
FIG. 4 is a view of the spindle support head with portions broken away.

FIG. 1 shows a vertical boring machine constructed in accordance with the invention and incorporating an elongated rectangular bed 10 on which are mounted a pair of parallel spaced horizontal guideway plates 12. A column 15 extends upwardly from one end of the bed 10 and supports a pair of parallel spaced vertically extending guideway plates 16.

A rectangular carriage 20 having an upper plate 21 is slidably mounted on the guideway plates 12 and is moved horizontally by a hydraulic cylinder 22 (FIG. 3) mounted on the column 15 and having a piston rod 23 connected to the carriage. A circular index table 25 is mounted on the upper plate 21 of the carriage 20 by a large diameter anti-friction ball bearing 26 and includes an internal ring gear 27. An indexing gearbox 28 is mounted on the under surface of the upper plate 21 of the carriage 30 and has an upwardly extending output shaft which supports a pinion 29 for engaging the ring gear 27. The gearbox 28 is driven by a hydraulic motor 30 also mounted on the carriage 20 and having an output shaft connected to the input shaft of the gearbox 28 by a coupling 31. Thus to index the table 25 relative to the carriage 20, the hydraulic motor 30 is energized for a predetermined time.

Referring to FIG. 2, an annular inverted T-shaped slot 34 is formed within the bottom surface of the table 25 adjacent its outer periphery. A series of annularly arranged hydraulic cylinders 35 are mounted on the upper plate 21 of the carriage 20, and each cylinder 35 includes a piston rod 36 which projects upwardly through an aligned hole 37 formed within the upper plate 21 and into the T-slot 34. A circular head 38 is mounted on each rod 36 and is located within the slot 34 so that when the cylinders 35 are energized and the rods 36 are retracted, the table 25 is pulled downwardly and clamped to the carriage 20 to form a substantially rigid connection between the table 25 and the carriage 20 and thereby prevent any relative movement or vibration.

To provide positive and precise alignment between the table 25 and the carriage 20 at each of the index stations, the table 25 incorporates a series of uniformly spaced and annularly arranged openings 42 in each of which is mounted a hardened sleeve 43 having a cylindrical bore 44. A single opening 46 is formed within the upper plate 21 of the carriage 20 and supports a hardened sleeve 48 having a cylindrical bore 49 which aligns vertically with the bore 44 of each sleeve 43 when the table 25 is rotated to define a plurality of index stations corresponding in number to the number of sleeves 43 within the table 25.

A hardened pin 55 is located within the bore 49 of the sleeve 48 and is surrounded by a linear anti-friction bearing 56 having a cylindrical cage 57 supporting a series of circumferentially and axially spaced balls 58. A hydraulic cylinder 60 is mounted on the carriage 20 and has a piston rod 62 which is threadably connected to the pin 55. The bearing 56 is preloaded within the sleeve 48 by the relative diameters of the pin 55 and bore 49, and the diameter of the bore 44 of the sleeve 43 is substantially identical with the diameter of the bore 49 so that when the rod 62 of the cylinder 60 is extended, the pin 55 moves upwardly into the bore 44 carrying with it the bearing 56 to form a positive, rigid and precise interlock between the carriage 20 and table 25.

Referring to FIGS. 1 and 3, a tool head 65 includes a housing 66 which is slidably mounted on the guideway plates 16 on the column 15. A hydraulic cylinder 70 is connected to the column by a bracket 71 and includes a piston rod 72 which is connected to the lower end portion of the bearing 66 by a bracket 73. Thus the vertical movement of the head 65 is controlled by actuation of the cylinder 70. A hydraulic positioner 75 determines the lower limit of downward movement of the head 65 and incorporates a dial 76 having a series of angularly arranged stops 78. The dial 76 is indexed by a hydraulic motor 79 for selectively positioning each of the stops 78 to engage the bottom surface of the bracket 73. It is to be understood that the head 65 may be mounted on a cross-slide which mounts on the guideway plates 16 to provide for lateral movement of the head.

Referring to FIG. 4, the housing 66 of the head 65 encloses a spindle 80 having its lower end portion 82 supported by a large diameter anti-friction bearing 84 retained within the lower end portion of the housing 66 by a ring 86 connected to the housing 66 by a series of screws 87. The spindle 80 includes a cylindrical surface 89 which is engaged by a pair of seal rings 90, and a ring 92 is threadably mounted on the lower end portion 82 of the spindle 80 to retain the inner races of the bearing 84 and to provide an outer cylindrical surface for engaging a seal ring 93.

The central portion of the spindle 80 includes a series of circumferentially spaced axially extending grooves 95 which form a surface for receiving a gearbelt 96 extending from a pulley mounted on the output shaft of a hydraulic motor 100 (FIG. 1) mounted on the side of the housing 66. The motor 100 is supplied with hydraulic fluid from a variable output hydraulic pump (not shown) which provides a variable speed drive for rotating the spindle 80 on its axis 101.

The upper end portion of the spindle 80 includes a cylindrical surface 102 on which is mounted the inner race of an anti-friction bearing 104 which is retained by a ring 105 secured to the upper portion of the spindle 80 by a series of screws 106. The upper race of the bearing 104 is confined within a support ring 108 which is mounted on the upper end of the housing 66 and secured by a series of screws 109. A ring 112 is mounted on the upper surface of the ring 108 and supports a sealing ring 113 which contacts the outer surface of the ring 105.

An axially extending cylindrical bore 120 is formed within the spindle 80 and has an axis 121 eccentric to the rotational axis 101 of the spindle. A tapered annular surface 122 is formed within the lower end portion 82 of the bore 120. An elongated boring bar 125 extends through the bore 120 and is supported for rotation relative to the spindle by a set of needle bearings 126 and 127 retained within opposite ends of the bore 120. The lower end portion of the bar 125 includes an external tapered surface 128 which mates with the internal surface 122 of the spindle 80 to form a collet-type connection. A face plate 130 forms the lower end portion of the bar 125 and is formed with a series of radially extending slots 131 for selectively receiving a drive key 132 which is mounted on the lower end face of the spindle 80.

A boring head 135 includes a cylindrical portion 136 projecting from a flange portion 138 which is removably secured to the face plate 130 by a series of screws (not shown) extending axially through the flange portion and threaded into the face plate so that the axis of the cylindrical portion 136 is aligned with the axis 121 of the boring bar 125. A pair of cross slide members 139 are mounted within the cylindrical portion 136 of the boring head 135 in axial spaced relation, and each member 139 supports a series of four cutting tools 140 arranged at 90° in relation to each other. The tools 140 project through corresponding rectangular openings 142 formed within the head 135.

A third tool support member 145 is rigidly secured to the lower end portion of the boring head 135 and also supports a series of four cutting tools 140 which project through corresponding rectangular slots 146. The specific construction of the boring head 135, including the number and angular relationship of the cutting tools 140, is determined according to the particular machining operations required on a workpiece. For this reason, the boring head 135 is removably connected to the face plate 130 of the boring bar 125 so that various forms of boring heads may be used.

The boring bar 125 includes a small diameter upper end portion 150 which projects from an annular shoulder 151. An annular plate 152 is mounted on the shoulder 151 and is secured to the bar 125 by a series of screws 153. An annular pressure plate 155 surrounds the bar 125 directly under the plate 152 and has a series of annularly arranged cylindrical cavities 157 formed within its lower surface. A corresponding series of aligned cavities 158 are formed within the upper surface of the ring 105, and a compression spring 160 extends within each set of aligned cavities 157 and 158 surrounding a concentric guide pin 162.

An annular housing 165 surrounds the pressure plate 155, and an annular support plate 166 is mounted on the upper end of the housing 165. An annular cavity 168 is formed within the lower surface of the plate 166 for receiving an annular inflatable air bellows 170. A pressure ring 172 is supported by the plate 166 directly under the air bellows 170 by a series of annularly arranged spring loaded bolts 173. The lower end portion of the pressure ring 172 engages the upper surface of the pressure plate 155 when pressurized air is supplied to the bellows 170 through a fitting 174 connected to the bellows.

A Geneva cam plate 180 is secured to the upper end portion 150 of the boring bar 125 by a nut 181 and includes a series of uniformly spaced radially extending cam slots 182. A cover housing 185 includes a circular plate 186 which is connected to an annular mounting flange 187 by a cylindrical wall 188. The flange 187 mounts on the top of the plate 166, and a series of peripherally spaced screws 189 secures the flange 187 and the plate 166 to the housing 165. A hydraulic motor 195 is mounted on the plate 186 and has a downwardly extending output shaft which supports a disk 196. A roller 198 is mounted on the disk 196 eccentrically to the rotational axis of the disk 196 and successively engages the cam slots 182 within the cam plate 180 when the motor 195 is actuated to produce corresponding indexing of the boring bar 125 and head 135.

A cylindrical housing 200 is secured to the upper surface of the plate 186 and has an upper end plate 201 which supports a hydraulic cylinder 205 having a vertically movable piston rod 206. An off-set coupling 208 is connected to the lower end portion of the rod 206 and retains a pair of aligned anti-friction bearings 209 which receive the upper end portion of an elongated rod 210 extending downwardly through an axially extending hole within the bar 125 and into the boring head 135. The lower end portion (not shown) of the rod 210 is connected to actuate one or more of the cross slide members 139 so that vertical movement of the piston rod 206 will produce lateral movement of the corresponding slide members 139 within the head 135.

A linear actuator 215 is mounted on the side of the cylinder 205 and has a shaft 216 which is connected by a bracket 218 to the upper end portion of the cylinder rod 206. The actuator is employed to indicate the radial position of the movable slide member 139. It is to be understood that the use of the radial movable slide members 139 within the head 135 by the hydraulic cylinder 205 per se forms no part of the present invention.

To illustrate the general operation of a machine tool constructed in accordance with the invention, a cylindrical fixture 225 is secured to the upper surface of the table 25 for supporting a workpiece W illustrated as a planetary gear case having a series of three uniformly spaced openings or cavities 226 each of which must be precisely machined for receiving a shaft bearing and corresponding seals. A series of hydraulic rams 228 and 229 are mounted on the fixture 225 for rigidly clamping the workpiece W to the fixture 225.

After the carriage 20 and table 25 are positioned by the hydraulic motor 30 and cylinder 22 so that one of the cavities 226 is positioned in alignment with the axis 101 of the spindle 80, the table 25 is locked and clamped to the carriage 20 by actuating the hydraulic cylinders 60 and 35 respectively. The hydraulic cylinder 70 is then actuated to lower the head 65 until the rotating boring head 135 enters the aligned cavity 226. Continued feeding of the head until the bracket 73 engages one of the pre-selected stops 78 of the positioning device 75 causes the selected group of axially aligned cutting tools 140 to form corresponding internal surfaces as illustrated in FIG. 4.

After the machining operations are performed on the workpiece W by the first group of cutting tools 140 and the tools are retracted slightly from the corresponding surface which they formed, the air bellows 170 is expanded, causing the pressure ring 172 to engage and press downwardly on the pressure plate 155 and thereby allowing the bar 125 to drop downwardly within the bore 120 until the driving connection formed by the cooperating tapered surfaces 122 and 128 and the engagement of the key 132 is released. The bar 125 is then indexed by energizing the motor 195 to produce one revolution of the disk 196 so that another group of axially aligned cutting tools 140 are presented for engaging the workpiece. The air pressure within the air bellows 170 is then released, and the springs 160 force the bar 125 upwardly within the bore 120 until a drive connection is again formed between the bar 125 and the spindle 80. The head 65 is then fed so that the new selected group of cutting tools 140 continue the machining of the workpiece.

From the drawings and the above description, it can be seen that a machine tool constructed in accordance with the present invention provides several desirable features and advantages. In general, by providing the elongated boring bar 125 with a head 135 having a series of angularly arranged tools 140, and by providing means for rotatably indexing the bar in successive increments corresponding to the angular displacement of the tools, a substantial number of surfaces can be machined on a workpiece without requiring the head 135 to be completely retracted from the opening within the workpiece before the head is indexed. That is, after performing one machining operation on the workpiece, the bar 125 is simply indexed on its axis 121 to present another cutting tool for performing another machining operation. While only four index stations are illustrated in the apparatus shown in FIG. 4, it is apparent that additional index stations may be provided depending upon the number of internal machining operations required on the workpiece.

Another advantage is provided by the relative masses of the spindle 80, boring bar 125 and head 135. That is, the large diameter spindle provides a flywheel effect, and the bar 125 and head 135 have a relatively large diameter to eliminate any significant deflection or vibration of the bar 125 and head 135 so that chattering between the tools 140 and the workpiece W is effectively eliminated during the machining operations. The collet-type connection between the tapered surface 128 on the bar 125 and the tapered surface 122 of the bore 120 in cooperation with the spring loaded pressure plate 155 and needle bearing 126, also assures a rigid connection between the bar 125 and the spindle 80 to prevent any vibration of the bar.

The construction of the rotary index table 25 and carriage 20 and the clamping and locking mechanism shown in FIG. 2 provides other desirable features. That is, by moving the pin 55 and the pre-loaded anti-friction cylindrical cage bearing 56 from the sleeve 48 partially into one of the sleeves 43 within the table 25, a positive and rigid lock is formed between the carriage 20 and table 25 at each index station of the table 25 so that precise alignment is assured. The hydraulic pulldown cylinders 35 also provide a positive means for clamping the table 25 to the carriage 20 at each index station to assure a rigid connection and prevent relative vibration.

As mentioned above, while the drawings show a bar 125 eccentrically positioned within a drive spindle 80 for use with a stationary workpiece W, it is within the scope of the present invention to hold the bar 125 stationary for machining a driven workpiece. Furthermore, it is within the scope of the invention to position the axis of the bar 125 horizontally or at any angle between horizontal and vertical positions depending upon the orientation of the surfaces to be machined on the workpiece.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for machining predetermined internal surfaces defining a hole within a workpiece comprising a housing, an elongated bar extending within said housing, a head member connected to said bar, means for mounting a plurality of cutting tools on said head member in angularly disposed relation, means for producing relative rotation between said head member and the workpiece on an axis extending into said hole and eccentric to said axis of said bar, and means for rotatably indexing said bar on its longitudinal axis relative to said housing for selectively presenting each of the cutting tools in position for machining said surfaces on the workpiece.

2. Apparatus for machining a workpiece, comprising a housing, a rotatable spindle mounted within said housing, means defining an axially extending bore within said spindle positioned eccentrically in relation to the rotatable axis of said spindle, a bar mounted within said opening, a head member connected to said bar, means for mounting a plurality of cutting tools on said head member in angularly disposed relation, means forming a drive connection between said spindle and said bar, and means for rotatably indexing said bar relative to said spindle for selectively presenting each of the cutting tools in position for machining the workpiece.

3. Apparatus as defined in claim 2 including mating tapered surfaces formed within said bore and on said bar adjacent said head member and forming a rigid connection between said spindle and said bar, and means for shifting said bar axially within said bore to release said engagement of said tapered surfaces for indexing said bar relative to said spindle.

4. Apparatus as defined in claim 3 wherein said means for shifting said bar axially within said bore comprises spring bias means carried by said spindle and urging said bar axially within said bore to effect normal engagement between said mating tapered surfaces, and clutch means connected to said housing and operable to release said spring bias means.

5. Apparatus as defined in claim 4 wherein said spring bias means comprises means forming an outwardly extending shoulder on said bar, an annular plate surrounding said bar adjacent said shoulder, a series of annularly disposed compression springs mounted on said spindle and urging said plate into engagement with said shoulder, and said clutch means comprises an annular clutch member adjacent said plate, and an annular fluid bellows adjacent said clutch member and operable to move said clutch member in an axial direction in response to inflation and thereby to move said plate against the bias of said springs to release said engagement between said tapered surfaces.

6. Apparatus as defined in claim 2 including hydraulic motor means mounted on said housing and having an output shaft, variable hydraulic pump means connected to said motor for supplying hydraulic fluid thereto, and a gearbelt connecting said shaft of said motor to said spindle.

7. Apparatus as defined in claim 2 including a rotatable table for supporting the workpiece, carriage means supporting said table for linear movement, means for rotatably indexing said table to a plurality of different stations, and means for locking said table against rotation at each said station.

8. Apparatus as defined in claim 7 wherein said locking means comprises a set of aligned cylindrical holes of substantially the same diameter within said table and said carriage, a cylindrical pin within one of said holes, an anti-friction sleeve bearing surrounding said pin and supporting said pin in preloaded condition for axial movement within said hole, and means for moving said pin and said bearing axially into a portion of the other said hole to form a positive lock between said table and said carriage.

9. Apparatus as defined in claim 2 including a table for supporting the workpiece and having a flat bottom surface, base means supporting said table for rotation, means for rotatably indexing said table relative to said base means to a plurality of different stations, an annular clamping surface on said table, a plurality of annularly arranged fluid cylinders mounted on said base means, and means adjacent said clamping surface and connected to each said cylinder to effect clamping of said table to said base member in response to actuation of said cylinders.

10. Apparatus as defined in claim 1 including an indexing plate connected to said bar, means defining a series of angularly arranged cam slots within said plate, a hydraulic motor connected to said housing and having an output shaft, and a crank member mounted on said shaft and positioned for successively engaging said cam slots in response to rotation of said shaft to produce said indexing of said bar.

11. Apparatus as defined in claim 1 including means for removably connecting said head member to said bar for interchanging head members having different groups of cutting tools thereon.

References Cited

UNITED STATES PATENTS 2,820,376   1/1958   Jannenga et al. _____ 77—58

GERALD A. DOST, *Primary Examiner.*

U.S. Cl. X.R.

77—58